US012543125B2

(12) United States Patent
Benammar et al.

(10) Patent No.: US 12,543,125 B2
(45) Date of Patent: Feb. 3, 2026

(54) SYSTEM AND METHOD FOR ADAPTIVE EIRP DENSITY CONTROL AND THROUGHPUT MAXIMIZATION IN WIRELESS COMMUNICATION SYSTEMS

(71) Applicant: Hughes Network Systems, LLC, Germantown, MD (US)

(72) Inventors: Nassir Benammar, Rockville, MD (US); Xiaoling Huang, Germantown, MD (US); Channasandra Ravishankar, Clarksburg, MD (US); John E. Corrigan, III, Chevy Chase, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 401 days.

(21) Appl. No.: 18/170,953

(22) Filed: Feb. 17, 2023

(65) Prior Publication Data

US 2024/0031949 A1    Jan. 25, 2024

Related U.S. Application Data

(60) Provisional application No. 63/391,624, filed on Jul. 22, 2022.

(51) Int. Cl.
*H04W 52/50*   (2009.01)
*H04B 7/185*   (2006.01)
(Continued)

(52) U.S. Cl.
CPC ........ *H04W 52/365* (2013.01); *H04B 7/1851* (2013.01); *H04W 52/346* (2013.01)

(58) Field of Classification Search
CPC ............. H04W 52/365; H04W 52/346; H04W 52/362; H04W 52/367; H04W 52/146; H04W 52/50; H04W 52/1851
(Continued)

(56) References Cited

U.S. PATENT DOCUMENTS 9,271,296 B2    2/2016  Olfat
11,811,489 B2 *  11/2023  Hultman ............ H04B 7/18513
(Continued)

OTHER PUBLICATIONS

V. Weerackody, "EIRP Variations due to Uplink Power Control in Small-Aperture Satellite Communication Links," 2014 IEEE Conference, Baltimore, MD, USA, 2014, pp. 1324-1330, (Year: 2014).*
(Continued)

*Primary Examiner* — Christopher M Crutchfield
*Assistant Examiner* — Syed Ahmed
(74) *Attorney, Agent, or Firm* — NovoTechIP International PLLC

(57) ABSTRACT

An adaptive transmit power control process enables the uplink transmit power of a user terminal to be adjusted based on a scan angle of the antenna for the user terminal. The antenna periodically reports the scan angle to the user terminal, and a current maximum transmit power for the user terminal is determined based on the scan angle. The current maximum transmit power is then used as the basis for determining an allocation of resources to the user terminal. The transmit power control process enables resources to be assigned as needed across multiple carriers and enables a power spectral density of a user terminal to be adjusted based on nominal and offset transmit power parameters.

18 Claims, 9 Drawing Sheets

(51) Int. Cl.
  *H04W 52/34* (2009.01)
  *H04W 52/36* (2009.01)
(58) Field of Classification Search
  USPC .......................................................... 370/311
  See application file for complete search history.

(56) References Cited

U.S. PATENT DOCUMENTS

| | | |
|---|---|---|
| 2007/0026795 A1 | 2/2007 | de La Chapelle |
| 2014/0323173 A1* | 10/2014 | Shin ...................... H04W 52/06 |
| | | 455/522 |
| 2015/0126239 A1* | 5/2015 | Kim .................... H04W 52/146 |
| | | 455/522 |
| 2019/0007129 A1 | 1/2019 | Vargas et al. |
| 2020/0059867 A1* | 2/2020 | Haghighat .......... H04W 52/367 |
| 2020/0252887 A1 | 8/2020 | Andou |
| 2021/0168728 A1* | 6/2021 | Liu ..................... H04W 52/146 |
| 2022/0103249 A1* | 3/2022 | Parr ................... H04B 7/18513 |
| 2023/0262615 A1* | 8/2023 | Li ......................... H04W 52/42 |
| | | 455/522 |

OTHER PUBLICATIONS

International Search Report and Written Opinion of the International Searching Authority mailed Nov. 10, 2023 for International Patent Application No. PCT/US2023/028400 (11 pages).

\* cited by examiner

SYSTEM AND METHOD FOR ADAPTIVE EIRP DENSITY CONTROL AND THROUGHPUT MAXIMIZATION IN WIRELESS COMMUNICATION SYSTEMS

BACKGROUND

Conventional satellite-based communication systems include gateways and one or more satellites to relay communication signals between the gateways and one or more user terminals. A gateway is an Earth station having an antenna for transmitting signals to, and receiving signals from, communication satellites. A gateway provides communication links, using satellites, for connecting a user terminal (UT) to other UTs or users of other communication systems, such as a public switched telephone network, the internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of one or more antennas. Each beam covers a particular geographic region within the footprint. Beams may be directed so that more than one beam from the same satellite covers the same specific geographic region. Gateways communicate with user terminals using forward and return (or reverse) links established via the beams. A forward link refers to a transmission from the gateway to a user terminal, and a return link refers to a transmission from a user terminal to a gateway. A forward link includes a forward uplink from the gateway to the satellite and a forward downlink from the satellite to a user terminal. The return link includes a return uplink from a user terminal to the satellite and a return downlink from the satellite to the gateway.

The uplink from the user terminals that are located within the same beam utilize the same physical uplink channel for transmitting data to the satellite. Because the physical uplink channel has a finite number of physical transmission resources, uplink scheduling schemes are used to manage the way in which the UTs transmit to gateways in order to optimize the allocation of resources and achieve desired performance characteristics, such as throughput, interference levels, and fairness. In general, uplink scheduling refers to the process of dividing and allocating resources to user terminals for the transmission of data. In addition to selection and allocation of resources, uplink scheduling includes the selection of appropriate modulation and coding schemes (MCSs) to use in the uplink channel (also referred to as link adaptation).

Uplink scheduling typically utilizes some form of uplink power control scheme or algorithm to control the transmit power utilized by an antenna to transmit data in an uplink channel. The goal of uplink power control is to achieve a desired balance between channel performance (e.g., throughput) and interference levels. Power control depends in part on regulatory limits set for Equivalent Isotropically Radiated Power (EIRP) and/or EIRP spectral density by a regulation authority, such as the FCC. Regulatory limits are used to define operating parameters of the antenna of a user terminal, such as the maximum EIRP, which in turn is used to define power spectral density (PSD) limits for the antenna. PSD limits are used to define a power limit mask for the antenna to maintain the PSD of the antenna in compliance with regulatory limits.

In previously known systems, maximum EIRP and PSD limits for an antenna were typically treated as constant or fixed values. However, as is known in the art, the maximum EIRP for an antenna can vary in certain situations, such as when the scan angle of an antenna results in loss of directivity. Loss of directivity translates directly to loss of EIRP. Previously known systems were generally not capable of adjusting the PSD limits of an antenna to accommodate changes in the maximum EIRP of the antenna. The limited ability to adjust PSD limits can result in inefficient utilization of the transmit power of the antenna. In some cases, changes to the maximum EIRP of an antenna could also result in the PSD limits not being effective in maintaining compliance with regulatory limits.

Uplink power control is further complicated in systems that support carrier aggregation. When multiple carriers are utilized, uplink power control has typically been performed independently for each carrier. Each carrier is typically assigned a dedicated portion of the total transmit power of the antenna. Consequently, separate EIRP limits, maximum EIRPs, and PSD limits are also defined for each carrier based on their portion of the transmit power. The transmit power of each carrier must then be selected to ensure that the aggregate transmit power for the carriers complies with the regulatory limits of the antenna.

In addition, because each carrier is assigned a dedicated portion of the transmit power, there is little flexibility in distributing resources among the carriers. Carriers can be denied additional resources if their portion of the transmit power is already being utilized. Carriers can also have a significant amount of unused transmit power which cannot be reallocated to other carriers. Previously known methods of uplink power control and resource allocation for carrier aggregation are therefore likely to suffer from inefficient power and resource utilization.

Hence, what is needed are systems and methods of uplink power control and resource allocation that enable more efficient utilization of transmit power and resources in an uplink channel.

SUMMARY

In one general aspect, the present disclosure presents an uplink power control system for a gateway of a satellite communication system. The uplink power control system includes a processor and a memory in communication with the processor having executable instructions that, when executed by the processor, cause the uplink power control system to perform multiple functions. The functions include receiving a maximum transmit power adjustment parameter from a user terminal (UT), the maximum transmit power adjustment parameter being indicative of a current maximum transmit power for an antenna of the UT; calculating a power spectral density per resource block and a maximum number of resource blocks to allocate based on the current maximum transmit power; and transmitting an allocation instruction message to the UT indicating the maximum number of resource blocks to allocate.

In yet another general aspect, the instant disclosure presents a method of performing uplink power control for at least one user terminal communicatively coupled to a gateway via an uplink channel. The method includes receiving a maximum transmit power adjustment parameter from a user terminal (UT), the UT being one of a plurality of UTs sharing the uplink channel, the maximum transmit power adjustment parameter being indicative of a current maximum transmit power for an antenna of the UT; calculating a power spectral density per resource block and a maximum number of resource blocks to allocate based on the current maximum transmit power; and transmitting an allocation instruction message to the UT indicating the maximum number of resource blocks to allocate.

In a further general aspect, the instant application presents a gateway for a satellite communication system including a processor and a memory in communication with the processor having executable instructions that, when executed by the processor, cause the gateway to perform multiple functions. The functions include periodically receiving a current scan angle of an antenna for a user terminal; determining a current maximum transmit power for the antenna based on the current scan angle, the current maximum transmit power being dependent upon a regulatory limit defined for the antenna; calculating a power spectral density per resource block and a maximum number of resource blocks to allocate to the user terminal based on the current maximum transmit power; adjusting a power spectral density (PSD) limit for the antenna based on the current maximum transmit power; and using the PSD limit as a power limit mask to maintain a PSD level of the antenna below the regulatory limit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
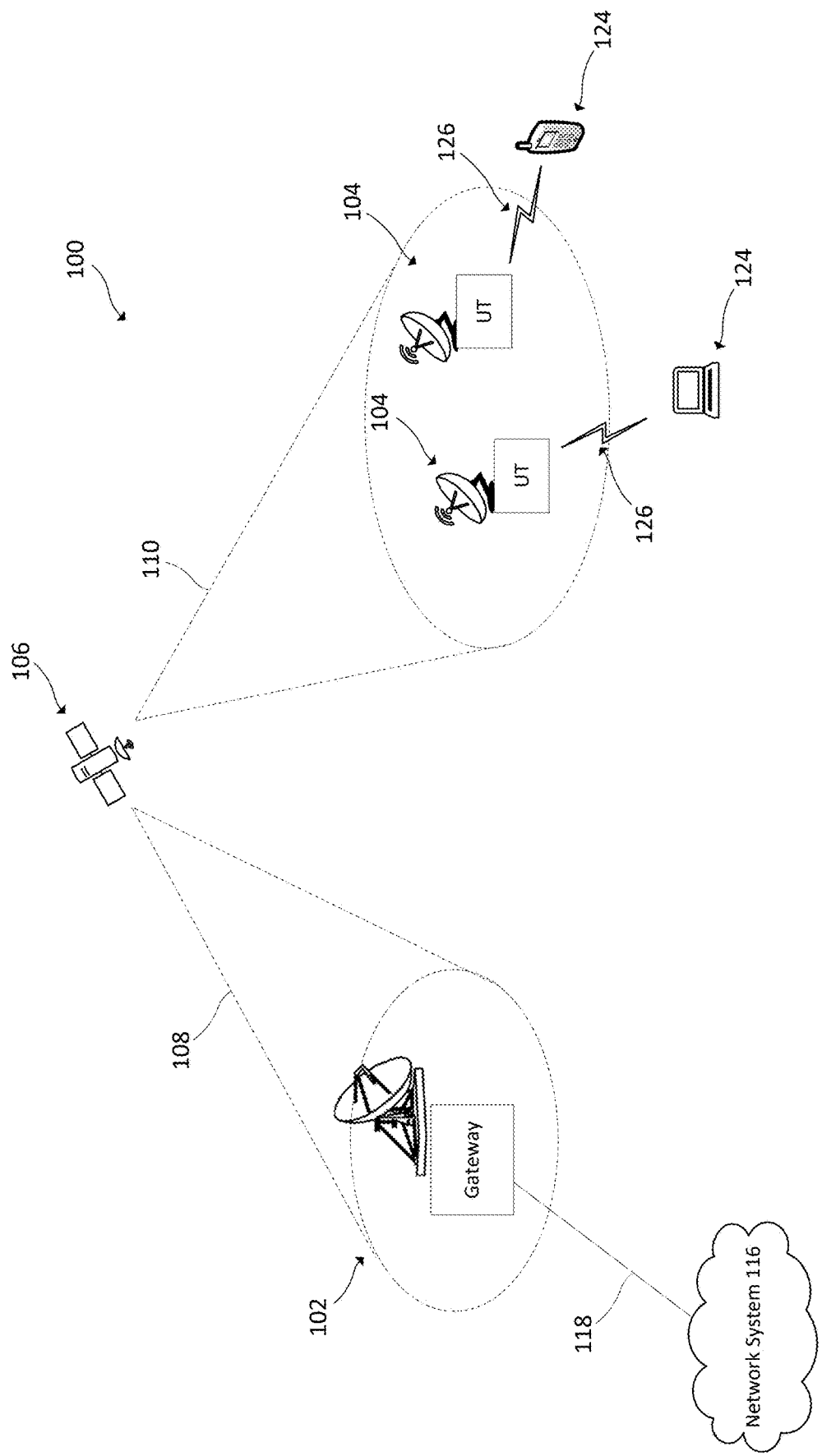
FIG. 1 shows an example system upon which aspects of the disclosure may be based.

The uplink from the UTs that are located within the same beam utilize the same physical uplink channel for transmitting data to the satellite. Because a physical uplink channel has a finite number of physical transmission resources, uplink scheduling schemes are used to manage the way in which UTs transmit to gateways in order to optimize the allocation of resources and achieve desired performance characteristics, such as throughput, interference levels, and fairness. In addition to selection and allocation of resources, uplink scheduling includes the selection of appropriate MCSs to use in the uplink channel (also referred to as link adaptation).

Uplink scheduling typically utilizes some form of uplink power control scheme or algorithm to control the transmit power utilized by an antenna to transmit data to a satellite. The goal of uplink power control is to achieve a desired balance between channel performance (e.g., throughput) and interference levels. Power control depends in part on regulatory limits set for EIRP and/or EIRP spectral density, referred to herein collectively as EIRP limits, for the antenna transmitting the data. EIRP is the amount of power that a theoretical isotropic antenna (i.e., an antenna that evenly distributes power in all directions) would emit to produce the peak power density observed in the direction of maximum antenna gain. EIRP limits are set by regulation authorities, such as the FCC (America), ETSI (Europe) or ACMA (Australia), and are intended, at least in part, to maintain transmit power below certain thresholds to limit interference between frequency bands. Different EIRP limits may be defined based on geographic regions, carrier characteristics, antenna types, and the like.

EIRP limits are used to define a maximum EIRP for each antenna used to transmit data in an uplink channel. The maximum EIRP for an antenna is used in turn to set the PSD limit for the antenna. The PSD limit is used to define a power limit mask for the antenna to maintain the PSD of the antenna in compliance with regulatory limits. In previously known systems, the maximum EIRP for a given antenna is used in deriving other parameters which are used in for power control, such as maximum transmit power per carrier ($P_{CMAX}$), power headroom (PH), power spectral density (PSD) per resource block (PowerPerRB), and maximum number of RBs (Max#RBs) to allocate per carrier. Once the maximum EIRP has been set for an antenna, the maximum EIRP has typically been considered a fixed or constant parameter for the antenna. However, as is known in the art, the maximum EIRP for an antenna can vary in certain situations. For example, UTs with phased array antennas incur directivity loss as a function of scan angle of the antenna. Loss of directivity in turn translates directly to loss in transmit power, or loss in EIRP, for the same input power. The maximum EIRP of a phased array antenna can therefore vary depending on the scan angle of an antenna.

However, previously known systems were generally not capable of adjusting the PSD limits of an antenna to accommodate changes in the maximum EIRP of the antenna. The limited ability to adjust PSD limits can result in inefficient utilization of the transmit power of the antenna. In some cases, changes to the maximum EIRP of an antenna could also result in the PSD limits not being effective in maintaining compliance with regulatory limits.

Uplink power control is further complicated in systems that support carrier aggregation. When multiple carriers are utilized, each carrier is typically assigned a dedicated portion of the total transmit power of the antenna. Uplink power control and resource allocation is then performed independently for each carrier. Consequently, separate EIRP limits, maximum EIRPs, and PSD limits are also defined for each carrier based on their portion of the transmit power. The transmit power of each carrier must then be selected to ensure that the aggregate transmit power for the carriers complies with the regulatory limits of the antenna.

In addition, because each carrier is assigned a dedicated portion of the transmit power, each carrier always has a certain amount of transmit power available to them at all times. However, this also means that there is little flexibility in distributing resources among the carriers. This can result in situations in which a carrier can be denied additional resources because they are currently utilizing all of the transmit power assigned to them. This can also result in situations in which a carrier has a large amount of available (i.e., unutilized) transmit power. In either case, assigning each carrier a dedicated portion of the transmit power can result in inefficient resource utilization at a user terminal.

To address these technical problems and more, in an example, this description provides technical solutions in the form of systems and methods for adaptive transmit power control and throughput maximization that enable the uplink transmit power to be controlled as a function of scan angle and that enables the transmit power to be distributed as needed across multiple carriers. To this end, the gateway includes an uplink power control system configured to implement a power control scheme that requires that the scan angle of the antenna to be periodically reported to the UT and/or the gateway. The scan angle is used to derive the current maximum EIRP. The current maximum EIRP may then be used to derive the current maximum transmit power for the antenna, power headroom, power spectral density per resource block, and maximum number of RBs to allocate to the UT.

The uplink power control system also enables open loop power control to be performed to adjust the desired target transmit power for a UT which enables a good initial power spectral efficiency when a UT is handed over from satellite to satellite. The target power level is set for each UT using a nominal transmit power parameter which is applied to each UT that utilizes the same uplink channel (i.e., within the same beam). The nominal transmit power parameter defines an initial (or unadjusted) power value or power level for the UTs. In some embodiments, the nominal transmit power is identical for each UT. In other embodiments, different nominal transmit powers may be set for different UTs and/or different groups of UTs if desired. The target power level for each UT is then set by offsetting the nominal transmit power of each UT based on an offset parameter. The offset parameter is selected for each UT independently and is applied to each UT to offset the nominal transmit power by a predetermined amount to achieve a desired target power level for the UT.

The uplink power control system also enables a UTs power budget to be assigned to distributed as needed across multiple carriers. To enable flexible resource distribution among carriers, the antenna of a UT reports its maximum aggregate transmit power level rather than power level per carrier. The uplink power control system uses the maximum transmit power, or the maximum EIRP, as the total power which can be allocated to any of the carriers while maintaining compliance with PSD limits.

The technical solutions described herein address the technical problem of inefficiencies and difficulties associated with uplink power control and resource allocation. The technical solutions bring improvements in transmit power and resource utilization by enabling the maximum EIRP of an antenna to be adjusted based on the scan angle of the antenna. The PSD limits can then be updated based on the adjusted maximum EIRP which improves the reliability of the compliance with regulatory limits. The systems and methods described herein enable a good initial power spectral efficiency when a UT is handed over from satellite to satellite using simple parameters which can be communicated using RRC signaling. The efficiency of transmit power and resource utilization is also improved by enabling the power budget to be distributed as needed across multiple carriers. As a result, unused resources are minimized for each transmission.

FIG. 1 is a simplified diagram of an exemplary satellite communication system 100 in which the systems and methods disclosed herein may be implemented. Satellite communications system 100 includes a gateway 102 (also known as a ground station, hub, gateway, and the like), one or more UTs 104, and a satellite system 106. Satellite system 106 includes one or more low earth orbit (LEO), medium earth orbit (MEO), and/or geostationary orbit (GEO) satellite systems. Satellite system 106 emits satellite signals in the form of spot beams 108, 110 which cover a limited geographic area. In the embodiment of FIG. 1, satellite system 106 emits a spot beam 108 which covers the geographic area in which the gateway is located and a spot beam 110 which covers the geographic area in which the UTs 104 are located. Gateway 102 communicates with UTs 104 using forward and return (or reverse) links established via the spot beams 108, 110. Forward links refer to transmissions from the gateway to the UTs, and return links refer to transmissions from the UTs to the gateway. The forward link includes an uplink from the gateway to the satellite and a downlink from the satellite to the UTs. The return link includes an uplink from the UTs to the satellite and a downlink from the satellite to the gateway.

Figure 2:
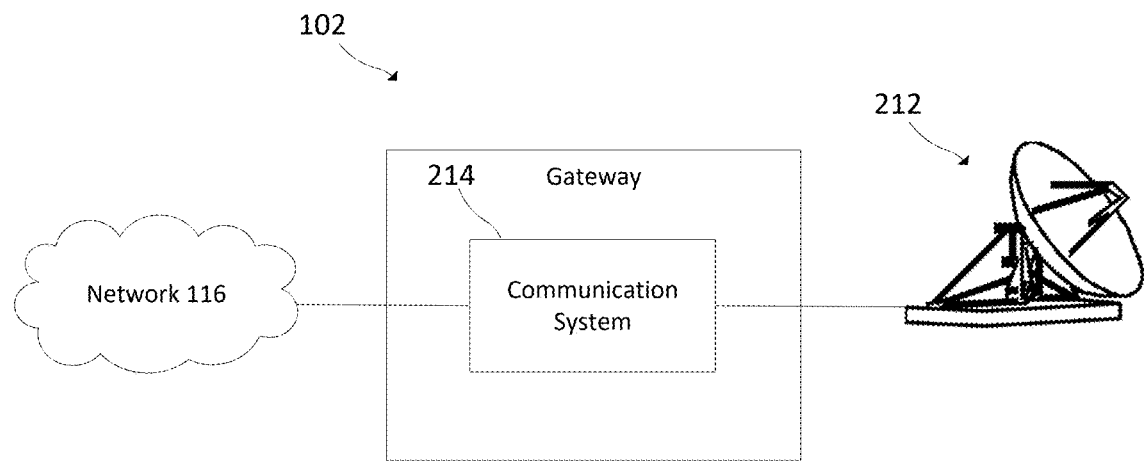
FIG. 2 shows a schematic diagram of an embodiment of a gateway for the system of FIG. 1.

Referring to FIG. 2, gateway 102 includes an antenna system 212 and a communication system 214 for communicating with the satellite system 106. The antenna system 212 comprises any suitable number and/or type(s) of antenna for sending and receiving data to and from a satellite. In embodiments, antenna system 212 includes one or more large antennas and/or antenna arrays. Communication system 214 includes one or more computing devices and hardware, such as interfaces, modulators, demodulators, power amplifiers, and the like, for enabling communications to and from the network and to and from satellite. Examples of computing devices that may be used in gateway 102 include servers, desktop computers, laptops, and the like which can be used to control different operations and devices associated with the gateway 102.

The gateway 102 is configured to provide connectivity to ground telecommunications infrastructures, such as, for example, network system 116. Network system 116 includes one or more networks, such as, for example, the Internet, an IP network, an intranet, a wide-area network (WAN), a local-area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting communications between devices as described herein. Network system 116 may include both wired and wireless connections as well as optical links. Network system 116 may connect gateway 102 with other gateways that may be in communication with satellite system 106 or with other satellites.

Gateway 102 is connected to the network system 116 by a communication link 118. In embodiments, the communication link 118 is a fiber optic communication link although any suitable type of communication link may be used. Gateway 102 receives data from Uts 104 via satellite system 106 and converts the data to a suitable format for communication to the network system 116 via communication link 118. Gateway 102 also receives data from the network system 116 via communication link 118 and converts the data for transmission to Uts 104 via satellite system 106.

Figure 3:
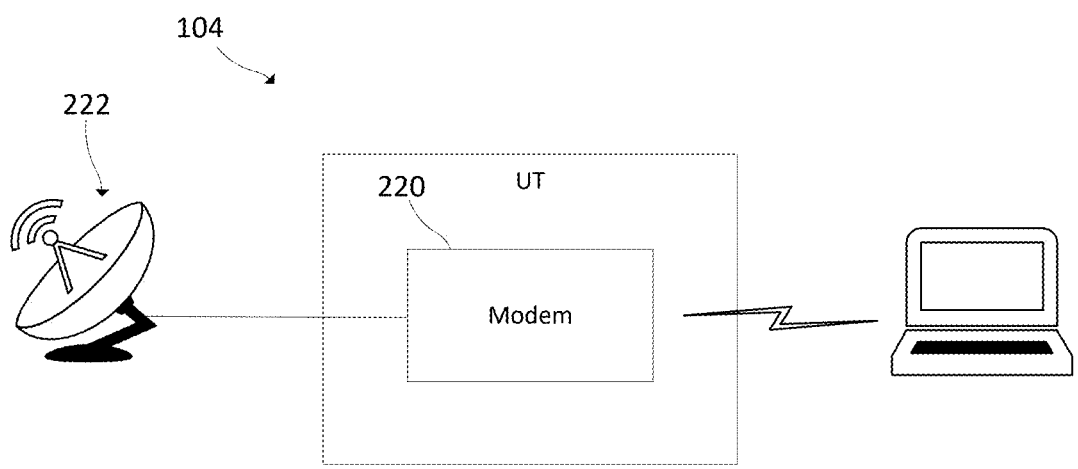
FIG. 3 shows a schematic diagram of an embodiment of a user terminal for the system of FIG. 1.

Referring to FIG. 3, UTs 104 (also known as satellite terminals) each include a modem 220 and antenna array 222 for communicating with satellite system 106. Modem 220 is configured to transmit and receive signals to and from the satellite system 106 via the antenna array 222. To this end, modem 220 may include one or more modulators, demodulators, amplifiers, gain control devices and the like. Antenna array 222 comprises one or more antennas that enable signals to be transmitted to and received from the satellite system 106. In embodiments, antenna array comprises a phased array antenna. Phased array antennas are electronically steerable meaning that the direction and shape of radiated signals can be changed electronically without having to physically move the antenna.

UTs 104 enable client devices 124 to connect to the network system 116 via the satellite system 106 and gateway 102. The client devices 124 include various computing devices which can be used by a consumer to communicate and/or access external networks. Examples of suitable client devices 124 include but are not limited to personal computers, desktop computers, laptop computers, mobile telephones, smart phones, tablets, phablets, smart watches, wearable computers, gaming devices/computers, televisions, and the like. In embodiments, each client device 124 is connected to an associated UT 104 by a communication link 126, such as a local area network (LAN). In embodiments, communication link 126 includes one or more wired or wireless networks, such as Wi-Fi or ethernet. Although FIG. 1 only illustrates one gateway 102 and two UTs 104, satellite communication system 100 can include any number of gateways 102 and UTs 104.

Communications via a satellite utilize one or more carriers over uplinks via which signals are transmitted to a satellite system 106 from a gateway 102 or UT 104 and downlinks via which signals are transmitted from satellite system 106 to gateway 102 or UT 104. Each carrier corresponds to a contiguous span of a frequency band or spectrum. Each carrier may have different characteristics in terms of coverage (the range around the antenna where signals can still be received) and capacity (bandwidth, data rates, throughput). In embodiments, the satellite system 106 is configured to utilize carrier aggregation. Carrier aggregation involves combining multiple carriers together in the same or different frequency bands to increase the effective bandwidth and improve data rates for users.

Uplink transmissions (i.e., transmissions from UTs to gateway) are made via an uplink channel, also referred to as a physical uplink shared channel (PUSCH). The uplink channel has a finite number of transmission resources. In embodiments, transmission resources comprise resource blocks. A resource block is a block of frequencies and/or time durations that are available on which to transmit wireless signals. For example, in a time division duplexing (TDD) network, the resource blocks may comprise time blocks of a specific frequency within the frequency spectrum. Alternatively, or in addition, in a frequency division duplexing (FDD) network, the resource blocks may comprise frequency blocks available at a specific time slot.

Because a physical uplink channel has a finite number of physical transmission resources, uplink scheduling schemes are used to manage access and allocation of resources to UTs. Uplink scheduling typically utilizes some form of uplink power control scheme or algorithm to control the transmit power utilized by an antenna to transmit data to a satellite. Power control depends in part on regulatory limits, or EIRP limits, set for EIRP and/or EIRP spectral density for the antenna transmitting data. EIRP limits are set by regulation authorities, such as the FCC (America), ETSI (Europe) or ACMA (Australia), and are intended, at least in part, to maintain transmit power below certain thresholds to limit interference between frequency bands. Different EIRP limits may be defined based on geographic region, carrier characteristics, antenna types, and the like. EIRP limits are used to define a maximum total EIRP for each antenna used to transmit data in an uplink channel. The maximum total EIRP for an antenna is used in turn to set the PSD limit for the antenna. The PSD limit is used to define a power limit mask for the antenna to maintain the PSD of the antenna in compliance with regulatory limits.

Figure 4:
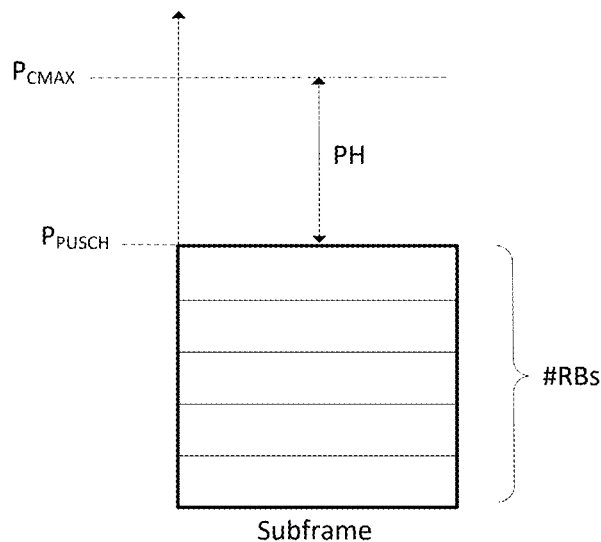
FIG. 4 shows a diagram illustrating a power headroom for a user terminal, such as the user terminal of FIG. 3.

To assist in uplink power control, UTs transmit a power headroom report (PHR) to the gateway which includes the UT's available power headroom per carrier. The power headroom indicates how much transmission power is left to use for each carrier in addition to the power being used by the current transmission for each carrier. Referring to FIG. 4, PH is defined as the difference between the maximum transmit power or PSD ($P_{CMAX}$) per carrier and the estimated power currently in use for each carrier ($P_{PUSCH}$). The maximum allowed PSD ($P_{CMAX}$) for a carrier corresponds to the EIRP for the portion of the maximum total EIRP assigned to the carrier. The current transmit power ($P_{PUSCH}$) for the carrier is indicative of the current number of RBs (#RBs) allocated to the carrier. From the gateway's point of view, a large PH means that the UT has more room to increase its power per carrier to accommodate a higher data rate transmission, while a small PH means that the UT cannot increase its data rate per carrier.

The PH for each carrier is used by the gateway in determining the maximum number of RBs (Max #RBs) that can be allocated to each carrier. More specifically, the PH of each carrier is used in determining the transmit power used per currently allocated RB (PowerPerRB), and the power per RB is then used in determining the maximum number of RBs (Max #RBs) that can be allocated to a carrier. In embodiments, the power per RB is calculated using the formula: PowerPerRB=$P_{CMAX}$−PH−10 log 10(#RBs) wherein #RBs corresponds to the number of RBs currently allocated to the UT. The maximum number of RBs (Max #RBs) that can be allocated to the UT is then calculated using the formula: Max #RBs=$P_{CMAX}$−PowerPerRB. PSD is used to represent uplink transmit power. In embodiments, PSD for each carrier is set by the gateway and is based at least in part on the maximum allowed power spectral density ($P_{CMAX}$) for the UT and a desired signal-to-noise ratio (SNR) for the uplink channel.

Figure 5:
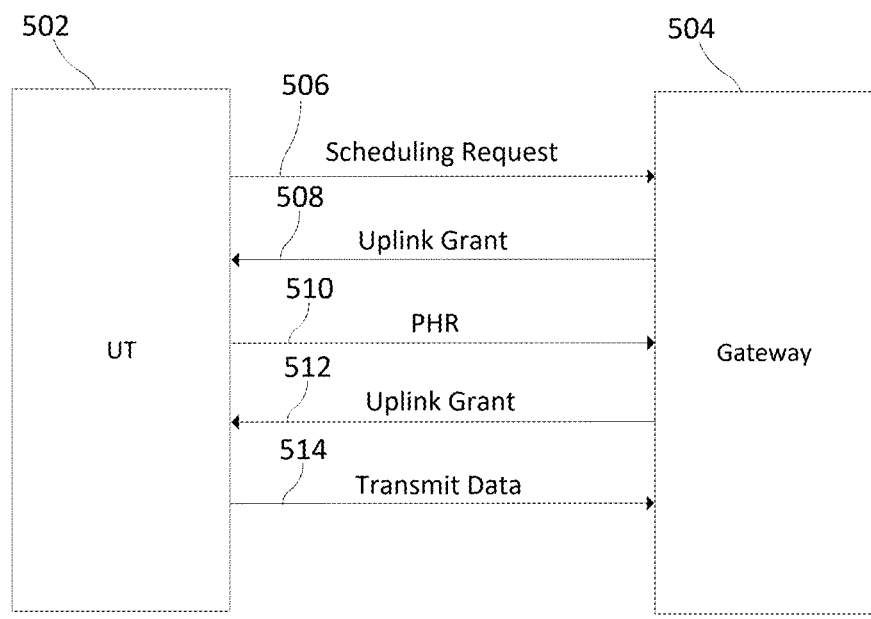
FIG. 5 is a diagram of a process flow for an uplink transmission from a user terminal to a gateway.

FIG. 5 shows an example implementation of a flow for initiating a new uplink transmission from a UT 502 to a gateway 504. When new data arrives at the UT 502, the UT 502, at event 506, transmits a scheduling request to the gateway 504. In embodiments, the scheduling request is transmitted to the gateway 504 via a control channel, such as a physical uplink control channel (PUCCH), if there have been no transmission resources previously assigned to the UT 502. Since this is a new connection, the gateway 504 does not know the current uplink channel conditions or the amount of pending data so the gateway 504 initially allocates a small amount of transmission resources (RBs) to the UT, shown at event 508. The UT 502 then transmits a PHR for at least one carrier to the gateway 504 using the initial resource allocation at event 510. With this additional information, the gateway 504 determines the power density and/or the number of additional RBs to allocate to the carrier at event 512. At event 514, the UT 502 transmits the data to the gateway 504 at a data rate depending on the number of RBs allocated to the carrier.

In embodiments, the messages between UTs and gateways to establish connections, relay configuration parameters, and perform uplink transmissions are transmitted using a suitable communication and/or signaling scheme. In embodiments, UTs and gateways are configured to utilize a Radio Resource Control (RRC) protocol for communicating configuration parameters. The RRC protocol defines how connections are established and released, system parameters and attributes, message types and formats, etc. The RRC protocol defines RRC Configuration and RRC Reconfiguration messages which can be used to communicate the configuration parameters to a UT from the gateway.

As discussed above, previously known uplink power control schemes suffer from various inefficiencies and restrictions that can result in inefficient power and/or resource utilization, such as the lack of the ability to adjust the maximum EIRP associated with a UT and/or the carriers utilized by a UT (and in turn the PSD limits for the UT and/or carriers of the UT), the lack of flexibility in the distribution of resources among multiple carriers, and the lack of the ability to adjust the current PSD to target values. To alleviate these problems associated with previously known satellite communication system, the gateway is provided with an uplink power control system configured to implement methods for adjusting maximum EIRP, distribute resources as needed to multiple carriers, and adjust the current PSD of UTs and/or carriers to desired target levels.

Figure 6A:
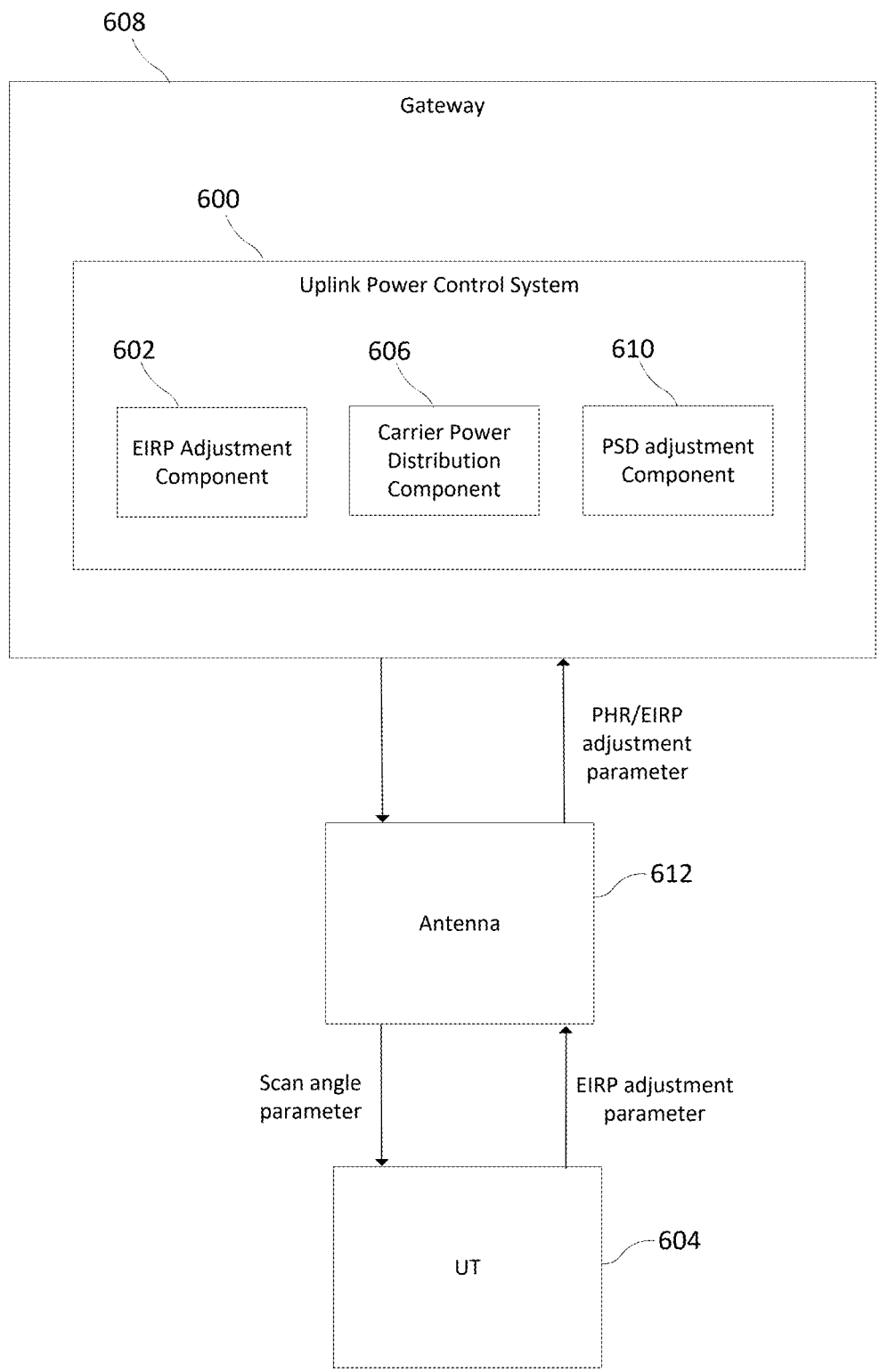
FIGS. 6A, 6B and 6C show an uplink power control system for a gateway of a satellite communication system in different operating states.

Referring to FIG. 6A, the uplink power control system 600 for a gateway 608 includes an EIRP adjustment component 602 that enables the maximum transmit power, i.e., the maximum EIRP, of the UT 604 and/or one or more of the carriers of the UT 604 to be adjusted based on the current scan angle of the UT's antenna 612. To enable EIRP adjustments, the antenna 612 is configured to periodically report at least one current operating parameter to the UT 604 that enables a determination of the current maximum transmit power/EIRP of the antenna. In embodiments, the current operating parameter corresponds to a current scan angle of the antenna and/or is indicative of one or more parameters or values that may be used to derive the current scan angle of the antenna.

The UT 604 then communicates a maximum transmit power adjustment parameter to the gateway that is based on the current operating parameter. In some embodiments, the UT 604 uses the current scan angle as the maximum transmit power adjustment parameter in which case the power control system 600 is configured to derive the current maximum transmit power of the UT from the current scan angle. In other embodiments, the UT 604 is configured to determine the current maximum transmit power for the UT based on the current scan angle and uses the current maximum transmit power as the maximum transmit power adjustment parameter. In embodiments, one or both of the UT 604 and the power control system 600 includes suitable hardware and/or software for determining the current maximum transmit power for the antenna based on the current scan angle. For example, the maximum transmit power levels for different scan angles may be stored in a lookup table, or other suitable data structure, in a memory. In other embodiments, the UT 604 is programmed with the appropriate formula for deriving the current maximum transmit power from the current scan angle. Maximum transmit power levels for different scan angles may be determined beforehand in any suitable manner.

In embodiments, the maximum transmit power adjustment parameter is transmitted to the power control system via one or more of a PUSCH uplink channel or a separate uplink channel, such as the physical upload control channel (PUCCH). In one implementation, the maximum transmit power adjustment parameter is included in an extended power headroom report along with the power headroom for the UT. In embodiments, the maximum transmit power adjustment parameter, with or without the PHR, is transmitted to the gateway 608 by RRC signaling.

The EIRP adjustment component 602 of the power control system 600 receives the maximum transmit power parameter from the UT and determines the current maximum transmit power for the UT. Once the current maximum transmit power/EIRP has been determined for the UT, the current maximum transmit power is used as the maximum transmit power (PcMax) in determining the transmit power per RB (PowerPerRB) and the maximum number of RBs (Max #RBs) to allocate as described above. In embodiments, the PSD limit for the UT and/or for one or more of the carriers of the UT can be adjusted based on the current maximum transmit power/EIRP.

Figure 6B:
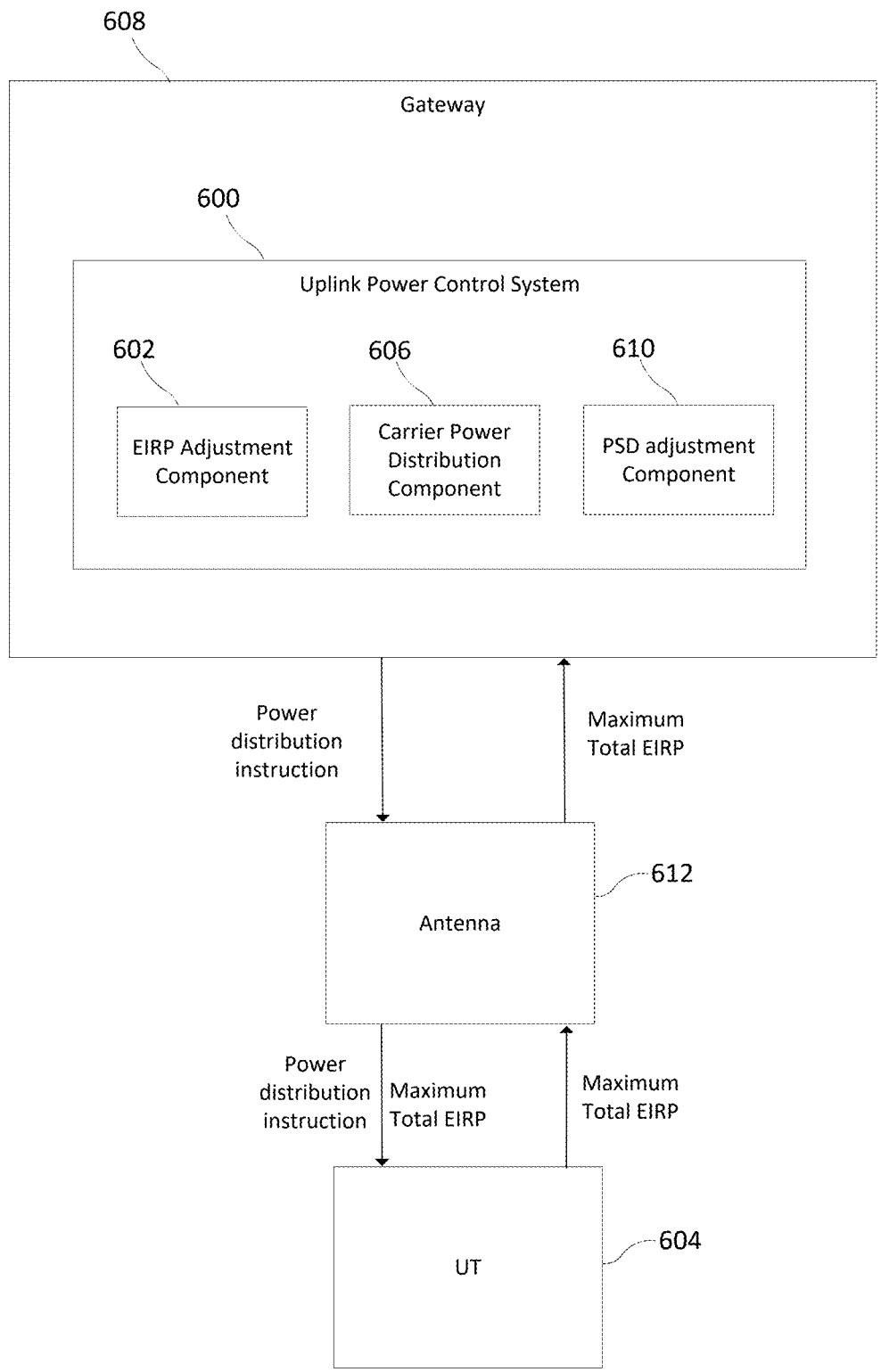

Referring to FIG. 6B, the uplink power control system 600 includes a carrier power distribution component 606 for controlling transmit power distribution among carriers of the UT. To enable distribution of transmit power, the UT antenna periodically reports the maximum total EIRP, or maximum aggregate EIRP, to the UT rather than the maximum EIRP per carrier. The UT 604 communicates the maximum total EIRP to the gateway 608 as the maximum transmit power adjustment parameter. The carrier power distribution component 606 receives the maximum total EIRP from the UT 604 and uses it as the maximum transmit power variable $P_{CMAX}$ in determining the spectral power per RB and the maximum number of RBs to allocate per carrier, as described above. The carrier power distribution component 606 transmits an allocation instruction message to the UT 604 that indicates the number of RBs to allocate to one or more carriers of the UT. The UT 604 receives the allocation instruction message and distributes transmit power to the carriers according to the instruction.

Figure 7:
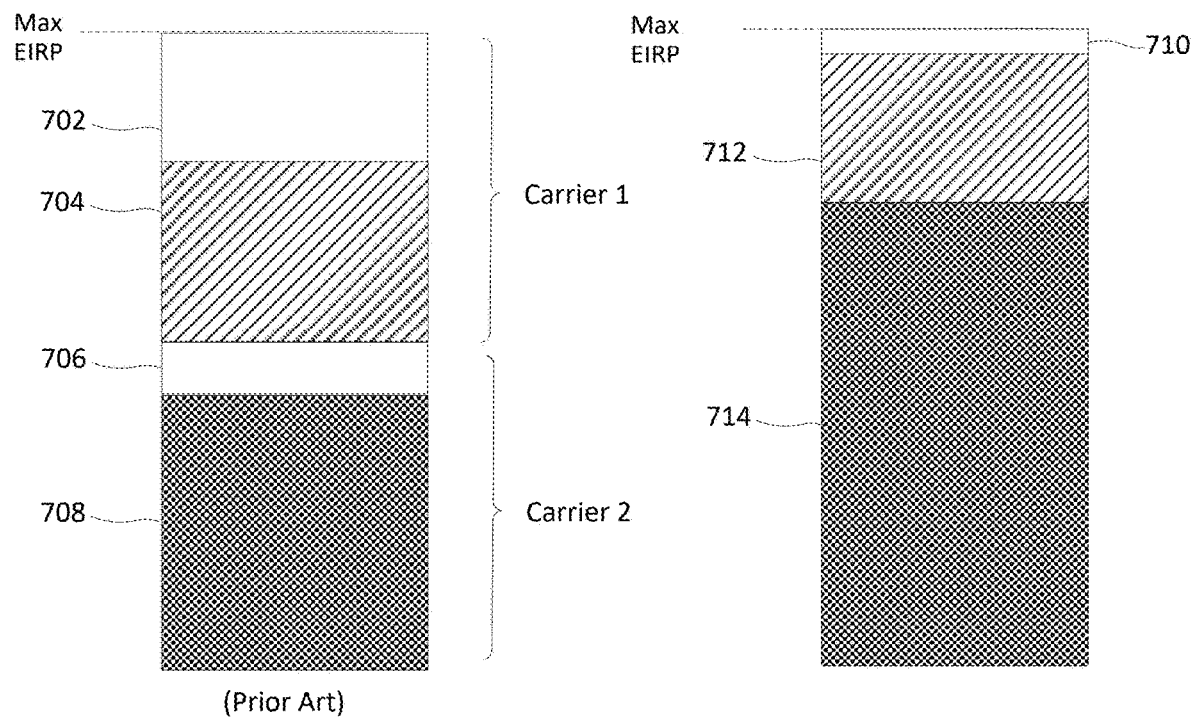
FIG. 7 shows a graphic representation of a prior art resource allocation scheme and a resource allocation scheme according to this disclosure.

FIG. 7 is an illustrative example of the efficiency of power and resource utilization across multiple carriers enabled by the power distribution component 606. FIG. 7 shows two graphics that each illustrate the power distribution to multiple carriers. The graphic on the left in FIG. 7 shows the power allocation scheme from the prior art in which carriers are each assigned dedicated portions of the maximum EIRP of the UT. As can be seen in FIG. 7, each carrier is assigned roughly half of the max EIRP of the UT. The transmit power 708 allocated to carrier 2 is nearly at the maximum level with a small area 706 indicative of the unused power in carrier 2's assigned portion. The transmit power 704 allocated to carrier 1 is lower compared to carrier 1 with a larger area 702 indicative of the unused power for carrier 1. The unused power from carrier 1 cannot be reassigned to carrier 2, or vice versa. As a result, the power allocation scheme of the prior art exhibits inefficient power utilization.

The graphic on the right in FIG. 7 shows the power distribution scheme implemented by the carrier power distribution component 606. Since there is no dedicated transmit power per carrier, the transmit power can be assigned to each carrier as needed. As seen in FIG. 7, carrier 2 can be assigned a greater portion 714 of the transmit power to handle more data while the carrier 1 is assigned a smaller amount 712 of transmit power to handle a smaller amount of data. A very small amount 710 of transmit power is left unused in this scenario which greatly improves the efficiency of power utilization relative to the prior art power distribution scheme.

Figure 6C:
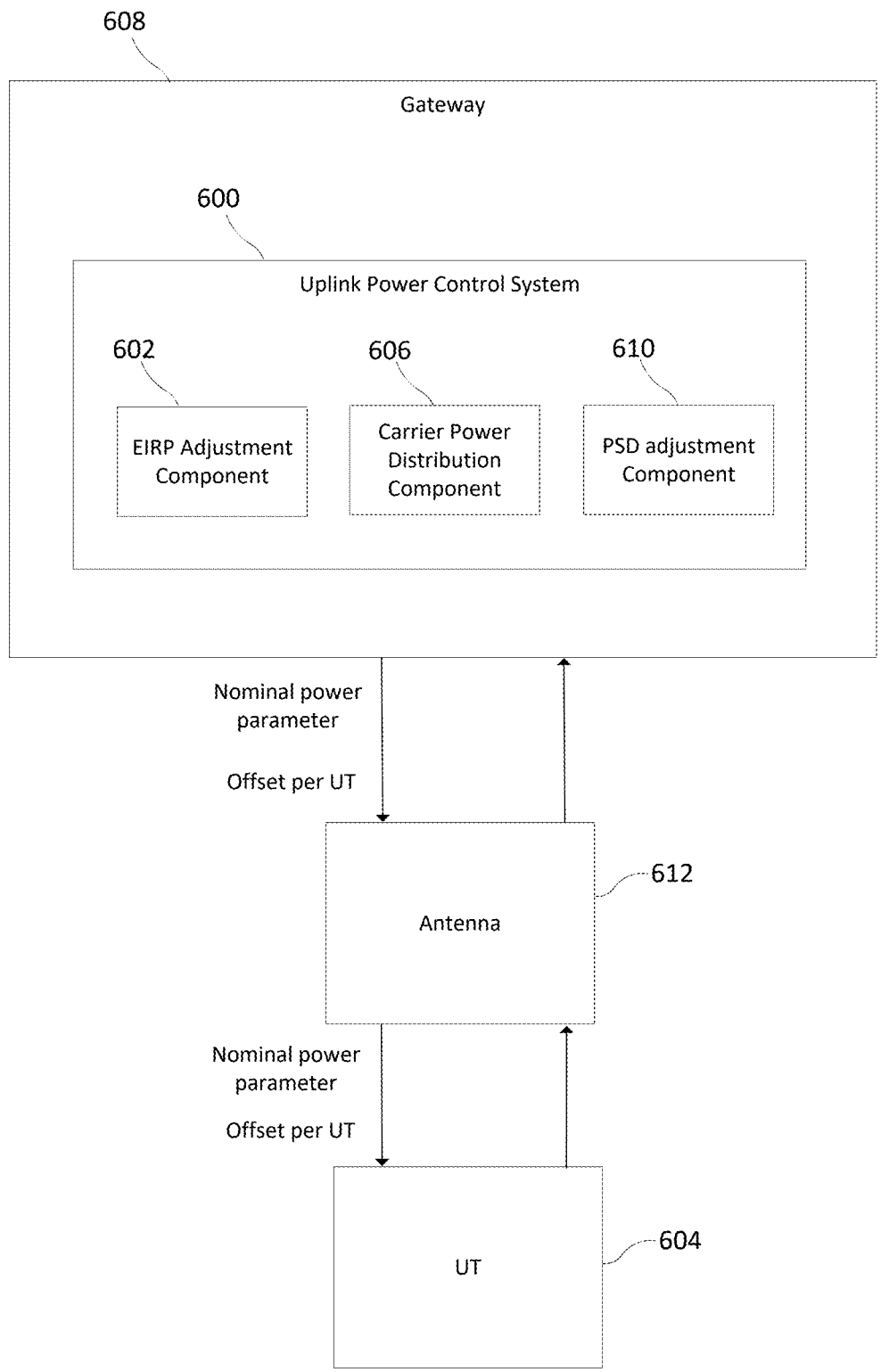

Referring to FIG. 6C, the uplink power control system 600 includes a PSD adjustment component 610 that enables the current PSD of all of the UTs on a shared uplink channel to be adjusted to different target PSD levels. To this end, the PSD adjustment component 610 is configured to utilize an open loop power control method to adjust the PSD of one or more UTs to desired levels. To adjust the PSD of a UT, the PSD adjustment component 610 sets a nominal uplink transmit power parameter (Po-NominalPusch) which is transmitted to all UTs on the same uplink channel (e.g., PUSCH). The nominal transmit power parameter is based in part on the desired SNR for the uplink channel. Because nominal transmit power values can result in higher than desired PSD for a UT, the PSD adjustment component 610 sets an offset parameter (e.g., Po-UE-PUSCH) that is used to offset the nominal transmit power of the UT to a desired level. In embodiments, a separate offset parameter is determined for each UT based on one or more of the maximum transmit power for the UT, the maximum EIRP for the UT, and the type of UT. In embodiments, closed loop power control is used to adjust the UT's transmit power to compensate for residual errors and/or to keep the transmit power at the desired level. In embodiments, closed loop power control utilizes a TPC (Transmit Power Control) command to adjust the transmit power of a UT.

Figure 8:
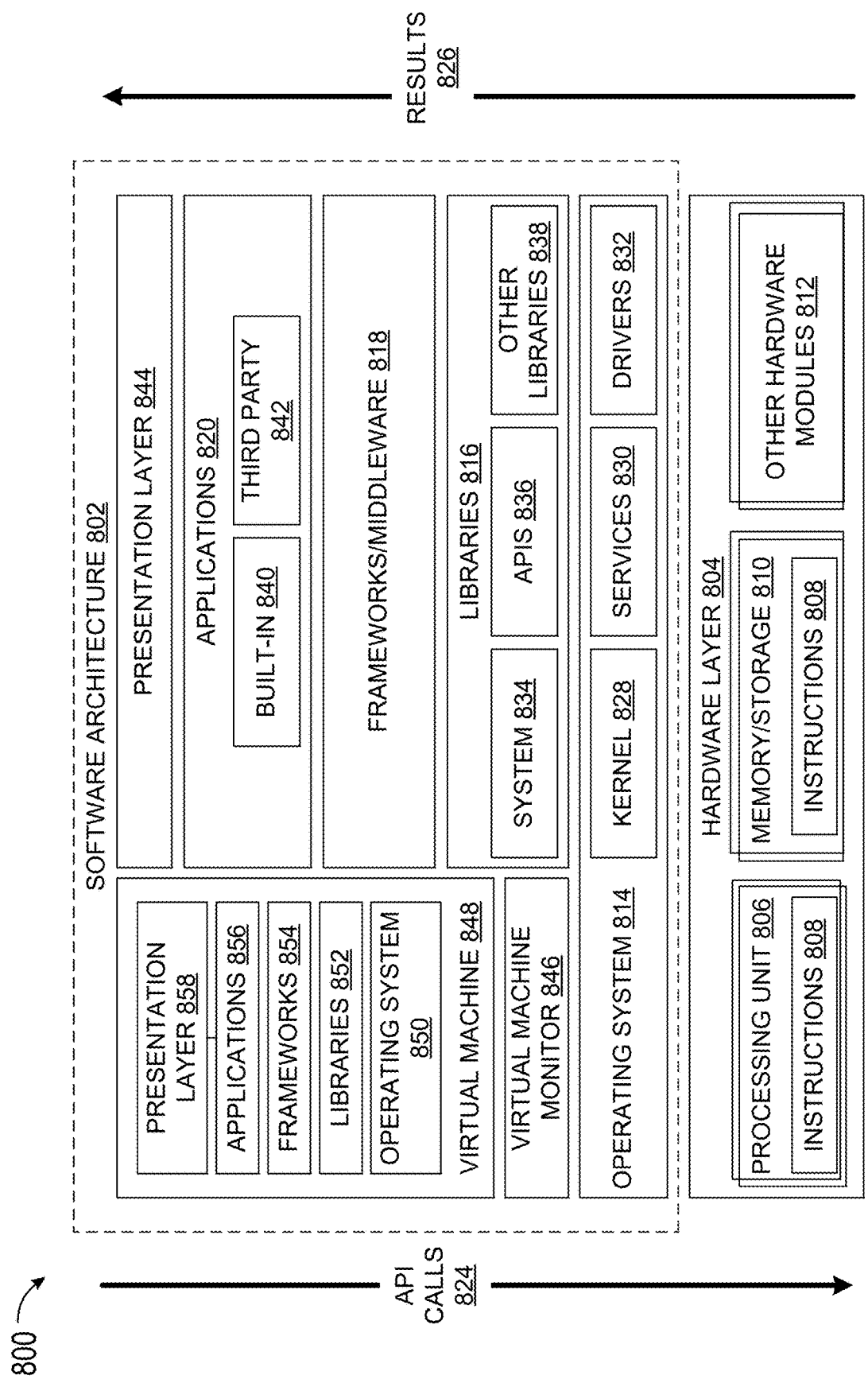
FIG. 8 is a block diagram illustrating an example software architecture, various portions of which may be used in conjunction with various hardware architectures herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as client devices, native application provider, web servers, server clusters, external services, and other servers. A representative hardware layer 804 includes a processing unit 806 and associated executable instructions 808. The instructions 808 represent executable instructions of the software architecture 802, including implementation of the methods, modules and so forth described herein.

The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular system. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine depicted in block diagram 900 of FIG. 9, for example). The virtual machine 848 may be hosted by a host OS (for example, OS 850) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
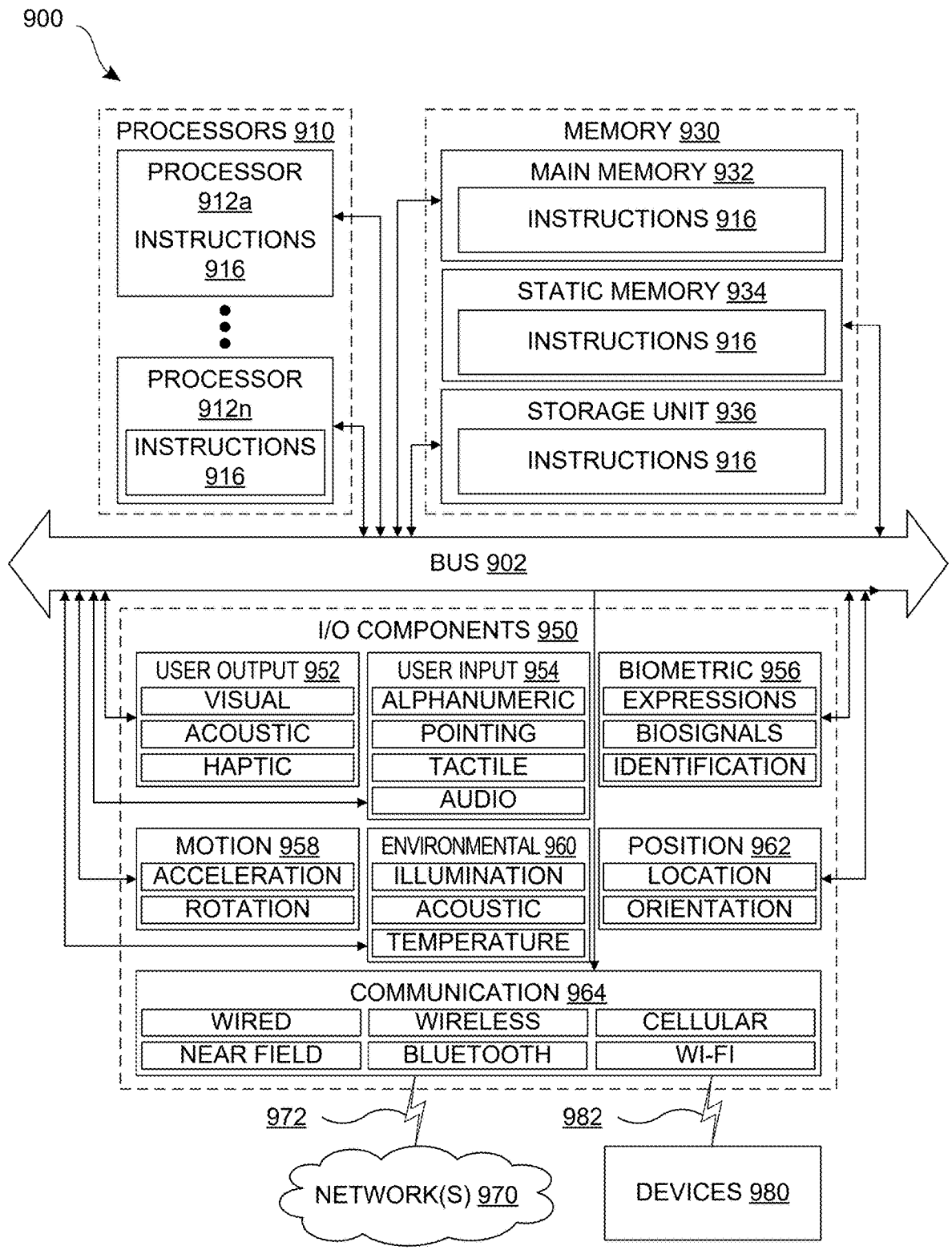
FIG. 9 is a block diagram illustrating components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement methods or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912*a* to 912*n* that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960 and/or position components 962, among a wide array of other environmental sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 962 may include, for example, location sensors (for example, a Global Position System (GPS) receiver), altitude sensors (for example, an air pressure sensor from which altitude may be derived), and/or orientation sensors (for example, magnetometers). The motion components 958 may include, for example, motion sensors such as acceleration and rotation sensors. The environmental components 960 may include, for example, illumination sensors, acoustic sensors and/or temperature sensors.

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 964, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-9) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. An uplink power control system for a gateway of a satellite communication system, the uplink power control system comprising:
  a processor; and
  a memory in communication with the processor, the memory comprising executable instructions that, when executed by the processor, cause the uplink power control system to perform functions of:
    receiving a maximum transmit power adjustment parameter from a user terminal (UT), the maximum transmit power adjustment parameter being indicative of a current maximum transmit power for an antenna of the UT;
    calculating a power spectral density per resource block and a maximum number of resource blocks to allocate based on the current maximum transmit power; and
    transmitting an allocation instruction message to the UT indicating the maximum number of resource blocks to allocate.

Item 2. The uplink power control system of item 1, wherein the current maximum transmit power corresponds to a maximum Equivalent Isotropically Radiated Power (EIRP) for the antenna.

Item 3. The uplink power control system of any of items 1-2, wherein the maximum EIRP is defined by a regulatory limit set for EIRP.

Item 4. The uplink power control system of any of items 1-3, wherein the functions further comprise:
  periodically reporting a current scan angle of the antenna to the UT; and
  determining the current maximum transmit power based on the current scan angle.

Item 5. The uplink power control system of any of items 1-4, wherein the current maximum transmit power for the current scan angle is determined using a lookup table.

Item 6. The uplink power control system of any of items 1-5, wherein the functions further comprise:
  adjusting a power spectral density (PSD) limit for the antenna based on the current maximum transmit power; and using the PSD limit as a power limit mask to maintain a transmit power of the antenna below the regulatory limit.

Item 7. The uplink power control system of any of items 1-6, wherein the current maximum transmit power is transmitted to the gateway in a power headroom report from the UT, the power headroom report indicating a power headroom for at least one of the UT and a carrier of the UT.

Item 8. The uplink power control system of any of items 1-7, wherein the UT includes a plurality of carriers, and wherein the allocation instruction message indicates a maximum number of resource blocks to allocate to each of the carriers.

Item 9. The uplink power control system of any of items 1-8, wherein each resource block is assignable to each of the carriers.

Item 10. The uplink power control system of any of items 1-9, wherein the UT is one of a plurality of UTs, and wherein the functions further comprise:
transmitting a nominal transmit power parameter to each of a plurality of UTs that shares a physical uplink channel, the nominal transmit power parameter setting an initial power level of each of the UTs to a nominal transmit power level indicated by the nominal transmit power parameter; and
transmitting a transmit power offset parameter to each of the UTs, the transmit power offset parameter offsetting the nominal transmit power by a predetermined offset, the predetermined offset being different for each of the UTs.

Item 11. The uplink power control system of any of items 1-10, wherein the predetermined offset is dependent on a UT type of each of the UTs.

Item 12. A method of performing uplink power control for at least one user terminal communicatively coupled to a gateway via an uplink channel, the method comprising:
receiving a maximum transmit power adjustment parameter from a user terminal (UT), the UT being one of a plurality of UTs sharing the uplink channel, the maximum transmit power adjustment parameter being indicative of a current maximum transmit power for an antenna of the UT;
calculating a power spectral density per resource block and a maximum number of resource blocks to allocate based on the current maximum transmit power; and
transmitting an allocation instruction message to the UT indicating the maximum number of resource blocks to allocate.

Item 13. The method of item 12, further comprising:
transmitting a nominal transmit power parameter to each of the UTs in the plurality of UTs, the nominal transmit power parameter indicating a nominal transmit power for the UTs, and
transmitting a transmit power offset parameter to each of UTs in the plurality of UTs, the transmit power offset parameter offsetting the nominal transmit power by a predetermined offset, the predetermined offset being different for each of the UTs in the plurality of UTs.

Item 14. The method of any of items 12-13, wherein the predetermined offset is dependent on a UT type of each of the plurality of UTs.

Item 15. The method of any of items 12-14, wherein the UT includes a plurality of carriers, and
wherein the allocation instruction message indicates a maximum number of resource blocks to allocate to each of the carriers.

Item 16. The method of any of items 12-15, wherein each of the resource blocks is assignable to each of the plurality of carriers.

Item 17. The method of any of items 12-16, further comprising:
periodically reporting a current scan angle of the antenna to the UT; and
determining the current maximum transmit power based on the current scan angle.

Item 18. The method of any of items 12-17, further comprising:
adjusting a power spectral density (PSD) limit for the antenna based on the current scan angle; and
using the PSD limit as a power limit mask to maintain a transmit power of the antenna below a regulatory limit.

Item 19. A gateway for a satellite communication system, comprising:
a processor; and
a memory in communication with the processor, the memory comprising executable instructions that, when executed by the processor, cause the gateway to perform functions of:
periodically receiving a current scan angle of an antenna for a user terminal;
determining a current maximum transmit power for the antenna based on the current scan angle, the current maximum transmit power being dependent upon a regulatory limit defined for the antenna;
calculating a power spectral density per resource block and a maximum number of resource blocks to allocate to the user terminal based on the current maximum transmit power;
adjusting a power spectral density (PSD) limit for the antenna based on the current maximum transmit power; and
using the PSD limit as a power limit mask to maintain a PSD level of the antenna below the regulatory limit.

Item 20. The gateway of item 19, wherein the current scan angle is received in a power headroom report from the user terminal.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. An uplink power control system for a gateway of a satellite communication system, the uplink power control system comprising:
   a processor; and
   a memory in communication with the processor, the memory comprising executable instructions that, when executed by the processor, cause the uplink power control system to perform functions of:
      receiving a maximum transmit power adjustment parameter from a user terminal (UT), the maximum transmit power adjustment parameter being indicative of a current maximum transmit power for an antenna of the UT;
      calculating a power spectral density per resource block and a maximum number of resource blocks to allocate based on the current maximum transmit power; and
      transmitting an allocation instruction message to the UT indicating the maximum number of resource blocks to allocate,
   wherein:
      each of the resource blocks is a block of frequencies and/or time durations that are available to the UT to transmit wireless signals over an uplink channel between the UT and the gateway;
      the UT includes a plurality of carriers; and
      the allocation instruction message indicates a maximum number of resource blocks to allocate to each of the plurality of carriers.

2. The uplink power control system of claim 1, wherein the current maximum transmit power corresponds to a maximum Equivalent Isotropically Radiated Power (EIRP) for the antenna.

3. The uplink power control system of claim 2, wherein the maximum EIRP is defined by a regulatory limit set for EIRP.

4. The uplink power control system of claim 3, wherein the functions further comprise:
   periodically reporting a current scan angle of the antenna to the UT; and
   determining the current maximum transmit power based on the current scan angle.

5. The uplink power control system of claim 4, wherein the current maximum transmit power for the current scan angle is determined using a lookup table.

6. The uplink power control system of claim 4, wherein the functions further comprise:
   adjusting a power spectral density (PSD) limit for the antenna based on the current maximum transmit power; and
   using the PSD limit as a power limit mask to maintain a transmit power of the antenna below the regulatory limit.

7. The uplink power control system of claim 1, wherein the current maximum transmit power is transmitted to the gateway in a power headroom report from the UT, the power headroom report indicating a power headroom for at least one of the UT and a carrier of the UT.

8. The uplink power control system of claim 1, wherein each resource block is assignable to each of the carriers.

9. The uplink power control system of claim 1, wherein the UT is one of a plurality of UTs, and
   wherein the functions further comprise:
      transmitting a nominal transmit power parameter to each of a plurality of UTs that shares a physical uplink channel, the nominal transmit power parameter setting an initial power level of each of the UTs to a nominal transmit power level indicated by the nominal transmit power parameter; and
      transmitting a transmit power offset parameter to each of the UTs, the transmit power offset parameter offsetting the nominal transmit power by a predetermined offset, the predetermined offset being different for each of the UTs.

10. The uplink power control system of claim 9, wherein the predetermined offset is dependent on a UT type of each of the UTs.

11. A method of performing uplink power control for at least one user terminal communicatively coupled to a gateway via an uplink channel, the method comprising:
receiving a maximum transmit power adjustment parameter from a user terminal (UT), the UT being one of a plurality of UTs sharing the uplink channel, the maximum transmit power adjustment parameter being indicative of a current maximum transmit power for an antenna of the UT;
calculating a power spectral density per resource block and a maximum number of resource blocks to allocate based on the current maximum transmit power; and
transmitting an allocation instruction message to the UT indicating the maximum number of resource blocks to allocate,
wherein:
each of the resource blocks is a block of frequencies and/or time durations that are available to the UT to transmit wireless signals over an uplink channel between the UT and the gateway;
the UT includes a plurality of carriers; and
the allocation instruction message indicates a maximum number of resource blocks to allocate to each of the plurality of carriers.

12. The method of claim 11, further comprising:
transmitting a nominal transmit power parameter to each of the UTs in the plurality of UTs, the nominal transmit power parameter indicating a nominal transmit power for the UTs, and
transmitting a transmit power offset parameter to each of UTs in the plurality of UTs, the transmit power offset parameter offsetting the nominal transmit power by a predetermined offset, the predetermined offset being different for each of the UTs in the plurality of UTs.

13. The method of claim 12, wherein the predetermined offset is dependent on a UT type of each of the plurality of UTs.

14. The method of claim 11, wherein each of the resource blocks is assignable to each of the plurality of carriers.

15. The method of claim 11, further comprising:
periodically reporting a current scan angle of the antenna to the UT; and
determining the current maximum transmit power based on the current scan angle.

16. The method of claim 15, further comprising:
adjusting a power spectral density (PSD) limit for the antenna based on the current scan angle; and
using the PSD limit as a power limit mask to maintain a transmit power of the antenna below a regulatory limit.

17. A gateway for a satellite communication system, comprising:
a processor; and
a memory in communication with the processor, the memory comprising executable instructions that, when executed by the processor, cause the gateway to perform functions of:
periodically receiving a current scan angle of an antenna for a user terminal;
determining a current maximum transmit power for the antenna based on the current scan angle, the current maximum transmit power being dependent upon a regulatory limit defined for the antenna;
calculating a power spectral density per resource block and a maximum number of resource blocks to allocate to the user terminal based on the current maximum transmit power;
adjusting a power spectral density (PSD) limit for the antenna based on the current maximum transmit power;
using the PSD limit as a power limit mask to maintain a PSD level of the antenna below the regulatory limit; and
transmitting an allocation instruction message to the user terminal indicating the maximum number of resource blocks to allocate,
wherein:
each of the resource blocks is a block of frequencies and/or time durations that are available to the user terminal to transmit wireless signals over an uplink channel between the user terminal and the gateway;
the user terminal includes a plurality of carriers; and
the allocation instruction message indicates a maximum number of resource blocks to allocate to each of the plurality of carriers.

18. The gateway of claim 17, wherein the current scan angle is received in a power headroom report from the user terminal.

* * * * *